United States Patent

Packer

[11] Patent Number: 6,058,453
[45] Date of Patent: May 2, 2000

[54] METHOD AND APPARATUS FOR SUBCODE/DATA SYNCHRONIZATION IN A COMPACT DISC SYSTEM

[75] Inventor: John S. Packer, San Jose, Calif.

[73] Assignee: STMicroelectronics, Inc., Carrollton, Tex.

[21] Appl. No.: 08/914,298

[22] Filed: Aug. 18, 1997

[51] Int. Cl.$^7$ .............................. G06F 13/00; G11B 17/22
[52] U.S. Cl. ............................. 711/112; 711/167; 369/32; 369/33; 713/400
[58] Field of Search ................................ 711/112, 167, 711/400, 500, 502, 503, 600; 369/32, 33, 47, 48, 54, 58

[56] References Cited

U.S. PATENT DOCUMENTS

| | | | |
|---|---|---|---|
| 4,994,925 | 2/1991 | Yamashita et al. | 358/343 |
| 4,996,679 | 2/1991 | Yoshio | 369/33 |
| 5,226,046 | 7/1993 | Hanson | 369/49 |
| 5,249,166 | 9/1993 | Hamilton et al. | 369/32 |
| 5,397,853 | 3/1995 | Koguchi | 84/609 |
| 5,508,983 | 4/1996 | Nakamura et al. | 369/32 |
| 5,551,054 | 8/1996 | Packer | 395/843 |
| 5,818,801 | 10/1998 | Watanabe et al. | 369/33 |

OTHER PUBLICATIONS

Denise G. Howe, "Compact Disc Direct Access Storage Disc (CD–DASD)", pp. 1–16, Rev. 1.1, Jan. 25, 1996, Optical Storage Data Center, Tucson, AZ.

Daniel Ewing, "Clickable Imagemap of a CD Player", Rev. ed., 1990, Time–Life Books, Alexandria, VA.

Unknown, "Subcode on the Compact Disk", pp. 1–3, 1990, Time–Life Books, Alexandria, VA.

Prof. Kelin J. Kuhn, "Audio Compact Disk—Writing and Reading the Data", EE 498, pp. 1–9, 1990, Time–Life Books, Alexandria, VA.

Prof. Kelin J. Kuhn, "Audio Compact Disk—An Introduction", EE 498, pp. 1–8, 1990, Time–Life Books, Alexandria, VA.

*Primary Examiner*—Glenn Gossage
*Attorney, Agent, or Firm*—Theodore E. Galanthay; Lisa K. Jorgenson; Steven Slater

[57] ABSTRACT

A disc drive apparatus and a method for synchronizing information components read from a compact disc media are described. The method includes selecting a start minutes/seconds/frames MSF for a data component and triggering a transfer of the data component to a buffer when the start minutes/seconds/frames for the data is detected. The method also includes selecting a start minutes/seconds/frames for a subcode component and triggering a transfer of the subcode component to the buffer when the start minutes/seconds/frames for the subcode is detected. A buffer manager monitors the contents of the buffer and counts the data and subcode components through separate counters. The buffer manager releases the data component and the subcode component to a host from the buffer when synchronization of the data component and the subcode component is detected. Separate counters may be used to signify when the data component and the subcode component have been received by the buffer, and the selecting of the start minutes/seconds/frames may be performed by an auto-start integrated circuit state machine. The apparatus may also include an error detection and correction (EDAC) unit for checking the integrity of a data block containing the data component and the subcode component before the block is released to the host.

21 Claims, 8 Drawing Sheets

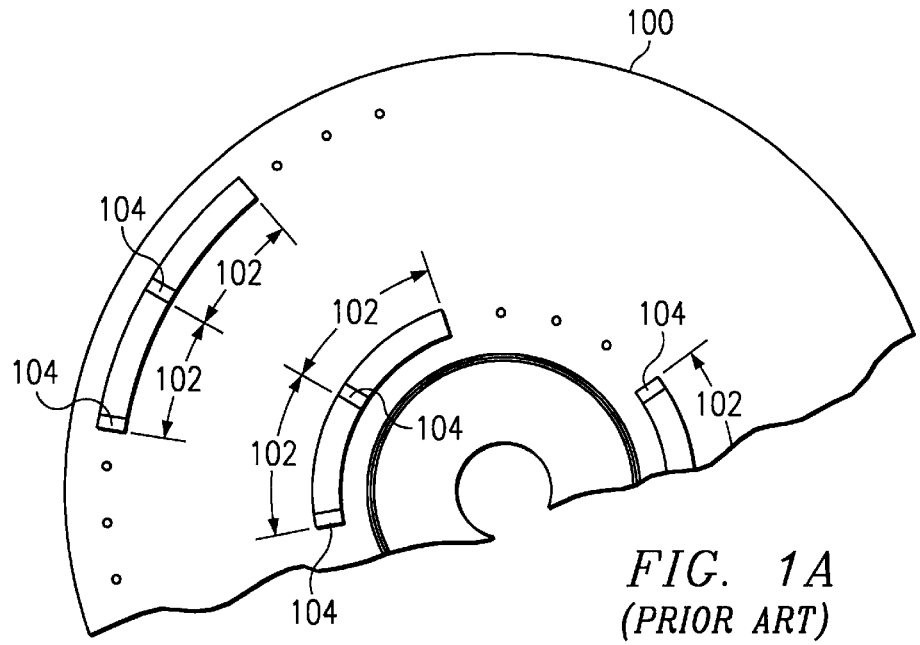
FIG. 1A
(PRIOR ART)
FIG. 1B
(PRIOR ART)
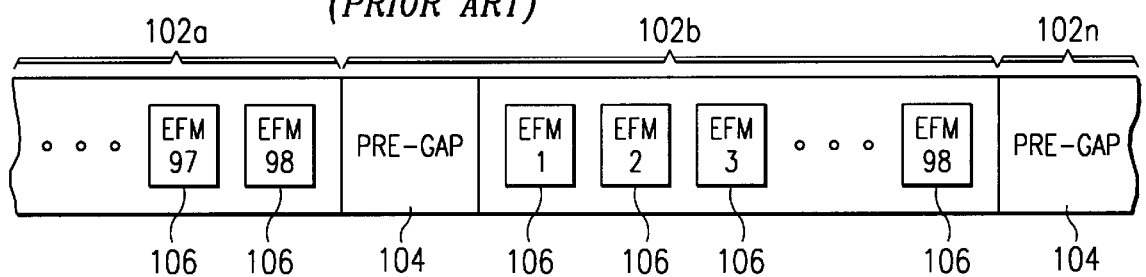
FIG. 1C
(PRIOR ART)
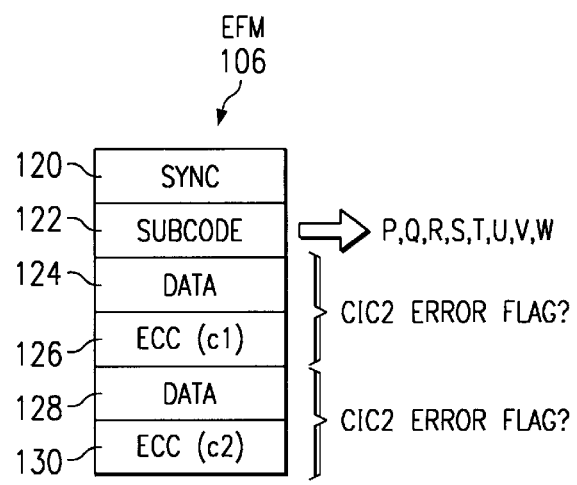

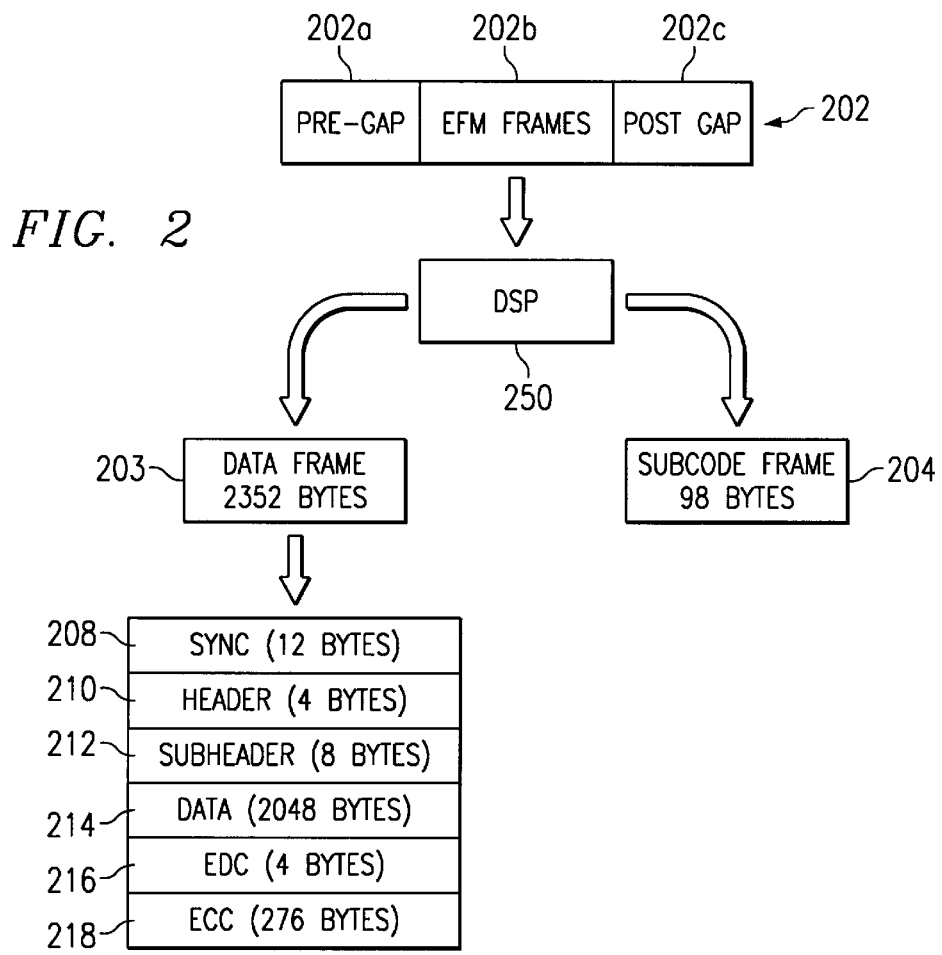

| BLOCK 20 | BLOCK 21 | BLOCK 22 | BLOCK 23 | BLOCK 24 |
|---|---|---|---|---|
| $MSF_{20}$(DATA) | $MSF_{21}$(DATA) | $MSF_{22}$(DATA) | $MSF_{23}$(DATA) | $MSF_{24}$(DATA) |
| $MSF_{20}$(SUBCODE) | $MSF_{21}$(SUBCODE) | $MSF_{22}$(SUBCODE) | $MSF_{23}$(SUBCODE) | $MSF_{24}$(SUBCODE) |

| COUNTERS | | UNRELEASED FRAME NUMBER | COUNTER STATUS | BCTR (COMPLETE BLOCKS) — 408 | |
|---|---|---|---|---|---|
| R1 | 402 — DD<br>404 — DS<br>E — 406 | 20<br>20,21,22 | 1<br>3<br>1 | 0 | |
| R2 | DD<br>DS<br>E | 0<br>21,22 | 0<br>2<br>0 | 1 | ← BLOCK "20" RELEASE |
| R3 | DD<br>DS<br>E | 21<br>21,22,23 | 1<br>3<br>1 | 1 | |
| R4 | DD<br>DS<br>E | 0<br>22,23 | 0<br>2<br>0 | 2 | ← BLOCK "21" RELEASE |
| R5 | DD<br>DS<br>E | 22<br>22,23,24 | 1<br>3<br>1 | 2 | |
| R6 | DD<br>DS<br>E | 0<br>23,24 | 0<br>2<br>0 | 3 | ← BLOCK "22" RELEASE |
| R7 | DD<br>DS<br>E | 23<br>23,24 | 1<br>2<br>1 | 3 | |
| R8 | DD<br>DS<br>E | 0<br>24 | 0<br>1<br>0 | 4 | ← BLOCK "23" RELEASE |
| R9 | DD<br>DS<br>E | 24<br>24 | 1<br>1<br>1 | 4 | |
| R10 | DD<br>DS<br>E | 0<br>0 | 0<br>0<br>0 | 5 | ← BLOCK "24" RELEASE |

METHOD AND APPARATUS FOR SUBCODE/DATA SYNCHRONIZATION IN A COMPACT DISC SYSTEM

CROSS REFERENCE TO RELATED APPLICATIONS

This application is related to U.S. patent application Ser. No. 08/914,296 filed Aug. 18, 1997 entitled "Methods and Apparatus For Compact Disc Automatic Start," and U.S. application Ser. No. 08/914,382 filed Aug. 18, 1997 entitled "Methods and Apparatus For Delayed Block Release in Compact Disc Systems." These applications are hereby incorporated by reference.

BACKGROUND OF THE INVENTION

1. Field of the Invention

This invention relates generally to compact discs, and more particularly to efficient integrated circuit processing of sector components in high speed compact disc drives.

2. Description of the Related Art

Compact disc drives have become increasingly popular due to their ability to rapidly access large quantities of data as well as provide fine quality digital play-back. To meet the need for increased data transfer rates, compact disc (CD) hardware engineers have been designing CD drives that are able to transfer data at speeds that are many times the rotational speed of normal audio CD speeds (e.g., 4×, 10×, 24×, . . . 50× . . . etc.). For example, when a CD contains normal audio, the processing and playback of the audio data is performed at 1× speeds. Accordingly, CD drives must be capable of operating at various speeds in order to appropriately process the data contained on a CD media, whether the CD media contains pure audio data or some other type of stored data.

Although there are many types of CD drives that provide different rotational speeds depending on the type of CD media being read, a new type of CD drive, which is capable of maintaining a constant high rotational speed irrespective of what the CD media has stored therein has recently been developed. The various advantages of such CD drives are discussed in greater detail in co-pending U.S. patent application Ser. No. 08/917,792,filed Aug. 18, 1997 entitled "An Improved Disc Drive," which is incorporated by reference herein. Because the CD is now capable of rotating at a constant high speed, the CD drive must be capable of reading and processing the data stored on the CD sufficiently fast to avoid introducing delays.

A common technique for increasing processing speeds has been to incorporate faster microprocessors; however, even fast processors have found reading and processing the CD media being spun at ever increasing speeds a challenge. By way of example, basic CD drive tasks, such as "seeking" to a location on the CD media in order to start play-back, are becoming increasingly difficult. In some cases, the microprocessor that is in charge of seeking to a particular "start" location on a CD media track has been found to be too slow to begin a play-back once the start location has been identified. That is, by the time the microprocessor determines that it has the correct start location, the CD media will have spun past its appropriate starting location. Many times, play-back may not start until a next sector is encountered.

FIGS. 1A through 1C illustrate, by way of background, techniques used to store data on a CD media 100. As is well known, the CD media 100 has a continuous track that spirals around the CD media 100, beginning at the inner region and ending at the outer edge. At the beginning of the track, a lead-in region typically contains a table of contents (TOC) that is used by the CD drive to ascertain where data recorded on the CD media 100 is located, in terms of minutes, seconds and frames (i.e., MSFs). As shown, the track of the CD media 100 is divided into many sectors 102, where each sector 102 contains 2352 bytes of data. The final sector 102 of the CD media 100 is then followed by a lead-out region, which signals the end of the CD media 100.

Besides the 2352 bytes of data, each sector also includes 98 subcode bytes, such that there are 98 bits of P-subcode, 98 bits of Q-subcode, 98 bits of R-subcode, 98 bits of S-subcode, 98 bits of T-subcode, 98 bits of U-subcode, 98 bits of V-subcode, and 98 bits of W-subcode. As is well known, each of these subcode bits may be used for a number of identification purposes. Typically, only the 98 bits of Q-subcode are used to ascertain the absolute subcode MSF of a particular sector 102. Of course, the Q-subcode is sometimes used for other processing and identification purposes as well.

FIG. 1B provides a closer examination of the typical contents of a sector that may be stored on a disc track. For example, each sector 102a–102n will typically contain a pre-gap region 104 that is typically used as a silent region. Generally, when the information stored on the disc is non-audio data, there is also a post-gap region (not shown), which may be silent or include some type of control information. Each sector 102a–102n also contains 98 "eight-to-fourteen modulation" (EFM) frames 106 that have both data and subcode components. As shown in FIG. 1C, each EFM frame 106 typically contains a SYNC field 120, a subcode field 122, a data field 124, a first error correction code (ECC) field, designated as ECC (C1) 126, a second data field 128 and a second ECC field designated as ECC (C2). When an error in the data 124 or 128 is detected, a C1C2 Error Flag is triggered, thereby indicating that at least one of the data components 124 or 128 contains an error. In addition, because a sector 102 has 98 bytes of subcode, each EFM frame will contain 8 bits of subcode (i.e., a P-bit, a Q-bit, an R-bit, an S-bit, a T-bit, a U-bit, a V-bit, and a W-bit).

In operation, when a user wants to seek out to a particular subcode MSF on the CD media, a head actuator (not shown) moves an optical reading head to the radial position where the desired data is believed to be located. To identify the location, the optical reading head is required to sequentially read out one Q-bit at a time from a sector 102 until all 98 Q-bits have been read. Once all 98 Q-bits are read, the CD drive must perform microprocessor operations to determine whether those 98 Q-bits define a subcode MSF that is equal to the desired subcode MSF. Once the microprocessor determines that the subcode MSF values match, the CD drive must be quick enough to start the transfer of subcode data.

As mentioned earlier, as disc speeds continue to increase, the microprocessors that are assigned the task of processing the 98 bytes of subcode for each sector 102, will find it challenging, if not impossible, to begin the data transfer before the next sector is encountered. Referring to FIG. 1B, after all 98 bytes of subcode for sector 102a have been read by the CD drive, and the microprocessor performs the necessary operations to determine that sector 102a has the correct subcode MSF it was looking for (i.e., the found subcode MSF), the microprocessor is required to initiate the "start" of a subcode data transfer. However, even the fastest of microprocessors will experience that processing and finding the correct subcode MSF, and triggering a start after the correct subcode MSF is actually found is difficult without introducing delays.

Typically, when the data stored on the CD media 100 is other than audio, the data component also has its own associated MSF. However, typical CD drives internally separate a sector 102 that has just been read, into a subcode component and a data component. Unfortunately, these components are often times released from a holding buffer memory with offsets. For example, if the CD drive receives a subcode component having a subcode $MSF_1$ at time $t_1$ and a data component having a data $MSF_1$ at time $t_2$, the subcode component will necessarily be released before the data component. Although they have the same $MSF_1$, they are received by the holding buffer memory at different times (e.g., at $t_1$ and $t_2$), and therefore, an offset is necessarily introduced. Although the offset may be attributed to a number of factors, one reason for the offset is that the subcode or the data components were processed through the CD drive logic and microprocessor at different speeds.

In situations where the data stored in the CD media 100 contains graphics related information, many times graphics information is coded directly into the subcode (e.g., using at least some of the R–W bits). Consequently, if the subcode component is released before the data component, the data that is designed to interact with the subcode graphics will not match up. This problem is sometimes further complicated when offsets of several frames are produced, which may introduce play-back errors or degrade the quality of the data being read.

In view of the foregoing, there is a need for a compact disc drive that is capable of synchronizing subcode components and data components before being passed to a host for play-back.

SUMMARY OF THE INVENTION

Broadly speaking, the present invention fills these needs by providing a method and apparatus for synchronizing the subcode component and data component before being passed to a host. It should be appreciated that the present invention can be implemented in numerous ways, including as a process, an apparatus, a system, a device, a method, or a computer readable medium. Several inventive embodiments of the present invention are described below.

In one embodiment, a method for synchronizing information components read from a compact disc media is disclosed. The method includes selecting a start minutes/seconds/frames for a data component and triggering a transfer of the data component to a buffer when the start minutes/seconds/frames for the data is detected. The method further includes selecting a start minutes/seconds/frames for a subcode component and triggering a transfer of the subcode component to the buffer when the start minutes/seconds/frames for the subcode is detected. Other steps include releasing the data component and the subcode component to a host from the buffer when synchronization of the data component and the subcode component is detected.

In another embodiment, a disc drive apparatus is disclosed. The disc drive apparatus includes an auto-data start unit for triggering a transfer of a data component to a buffer when a target data minutes/seconds/frames is detected and an auto-subcode start unit for triggering a transfer of a subcode component to the buffer when a target subcode minutes/seconds/frames is detected. The apparatus further includes a buffer manager for monitoring the contents of the buffer, such that the buffer manager counts the data component and the subcode component through separate counters, and releasing the contents of the buffer when the buffer manager synchronizes the data component and the subcode component.

In yet a further embodiment, a disc drive is disclosed. The disc drive includes an auto-data starting means for triggering a transfer of a data component to a buffer when a target data minutes/seconds/frames is detected and an auto-subcode starting means for triggering a transfer of a subcode component to the buffer when a target subcode minutes/seconds/frames is detected. The disc drive further includes a buffering means for monitoring the contents of the buffer. The buffering means is configured to count the data component and the subcode component through separate counter means, and releases the contents of the buffer when the buffering means synchronizes the data component and the subcode component.

Advantageously, when the data component and the subcode component that are read from a CD media are synchronized, possible play-back errors are avoided. In a further advantage, when data is written to a CD media (e.g., a recordable compact disc "CD-R"), each component received from the host is first accounted for in a plurality of counters to ascertain that each block of data, subcode and error detection are synchronized. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIGS. 1A through 1C illustrate conventional techniques used to store data on a CD media.

FIG. 2 is block diagram illustrating the parsing of a sector into a data frame and a subcode frame in accordance with one embodiment of the present invention.

FIG. 3 illustrates a data stream and a subcode stream, each having a plurality of data frames and subcode frames, respectively, in accordance with one embodiment of the present invention.

FIG. 6A is a table that shows the organization of counters and status bits in a disc drive system in accordance with one embodiment of the present invention.

DETAILED DESCRIPTION OF THE PREFERRED EMBODIMENTS

Figure 4:
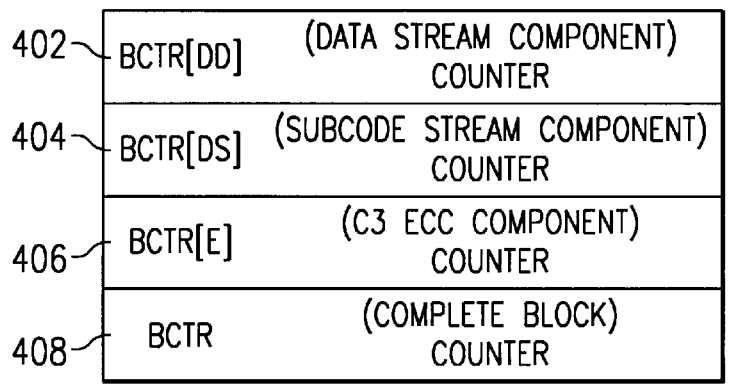
FIG. 4 illustrates the exemplary buffer counters used to implement the delayed block release in accordance with one embodiment of the present invention.

A preferred embodiment of the invention is described for a method and apparatus for synchronizing the subcode component and data component before they are passed to a host for play-back. In another embodiment, methods and apparatus for synchronizing subcode components and data components being received from a host, such that the synchronized components are error checked before being written to a CD media are described. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

FIG. 2 is block diagram illustrating the separation of data and subcode of a sector 202 in accordance with one embodiment of the present invention. As shown, the sector 202 typically includes a pre-gap region 202a, an EFM frame region 202b, and a post-gap region 202c. As is well known, the pre-gap region 202a and the post-gap region 202c may be used as silent transition regions between successive sectors on a CD media, and the EFM region 202b typically includes multiple groups of 98 EFM frames, such as those described in FIG. 1C above. As pictorially illustrated, the sector 202 is processed through a digital signal processor (DSP) 250, where the EFM frames are parsed in order to separate the data portions from the subcode portions.

By way of example, the DSP 250 is preferably well suited to separate the data to produce data frames 203 having 2352 bytes each. The subcode part is likewise arranged to produce subcode frames 204 having 98 bytes each. The data frames 203 may be further broken down into a number of sub-components. The sub-components include a SYNC 208 (12 bytes), a header (4 bytes) 210, a Subheader (8 bytes) 212, a Data block (2048 bytes) 214, an error detection code (EDC) (4 bytes) 216, and an ECC (276 bytes) 218. Because the data frame 203 contains the SYNC 208, the header 210 and the subheader 212, searches for a minutes, seconds and frames (MSFs) of the data are also possible. This is in contrast to CD mediums that only hold "pure sampled audio" data, where it is only possible to search to an MSF decoded from the Q-bits of the subcode. Accordingly, the following discussion will assume that the data may be both audio and non-audio data, and that MSF searches are possible in both the data frames 203 and the subcode frames 204.

With this in mind, FIG. 3 illustrates a data stream 302 and a subcode stream 304, each having a plurality of data frames 203 and subcode frames 204, respectively, in accordance with one embodiment of the present invention. The data stream 302 and the subcode stream 304 are numbered with exemplary frame numbers to more clearly illustrate the offsets that occur within the DSP 250 as a typical disc drive outputs the corresponding streams. In prior art disc drive systems, when a user selects data frames 20 through 24 to play-back, down load or read, the disc drive system would identify a data MSF of data frame 20. Unfortunately, the disc drive system often times selects the closest corresponding subcode frame; in this case, subcode frame 22 would be selected and output as a block with data frame 20. In some cases, the offset can be even more severe, ranging up to several frames.

In one embodiment of the present invention, when a user selects data frames 20 through 24, the disc drive system will be well suited to synchronize those data frames with the corresponding subcode frames 20 through 24. In this embodiment, the synchronization is facilitated through the use of a delayed block release operation. Preferably, the delayed block release operation implements a plurality of buffer counters to ascertain the status of the various components being read from the CD media.

FIG. 4 illustrates the buffer counters 400 used to implement the delayed block release operation in accordance with one embodiment of the present invention. The buffer counters 400 include a data stream component counter (BCTRDD [DD]) 402, a subcode stream component counter (BCTRDS [DS]) 404, a C3 ECC component counter (BCTRE [E]) 406, and a complete block counter (BCTR) 408. C3 ECC error parameters used in the error checking of data sectors as is well known to those skilled in the art. In one embodiment, the DD counter 402 is used to count the data frames 203 after a data MSF has been found in the data stream 302. In a like manner, the DS counter 404 is used to count the subcode frames 204 after a subcode MSF has been found in the subcode stream 304. Although only four exemplary counters are used in one embodiment of the present invention, it should be understood that any number of counters may be implemented to keep track of other components associated with the data stream 302 or subcode stream 304.

Figure 5B:
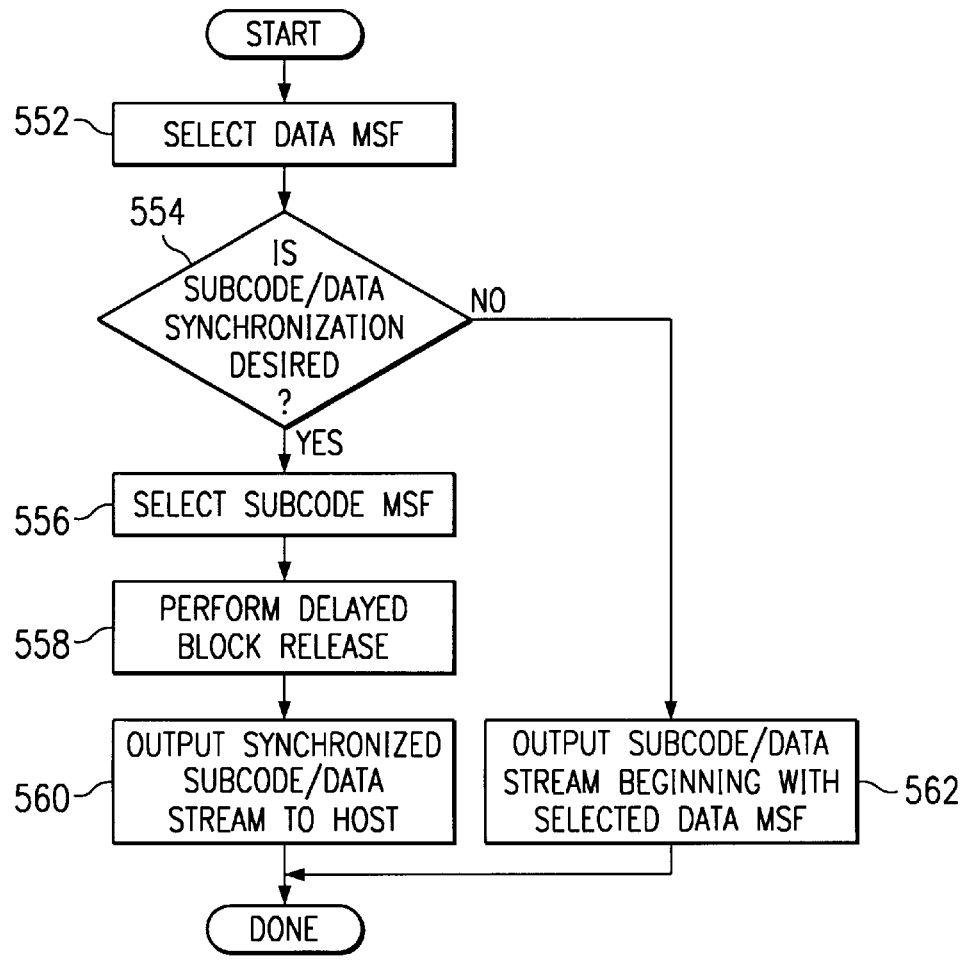
FIG. 5B is a flowchart diagram illustrating the method operations implemented in performing a subcode/data synchronization in accordance with one embodiment of the present invention.
Figure 5A:
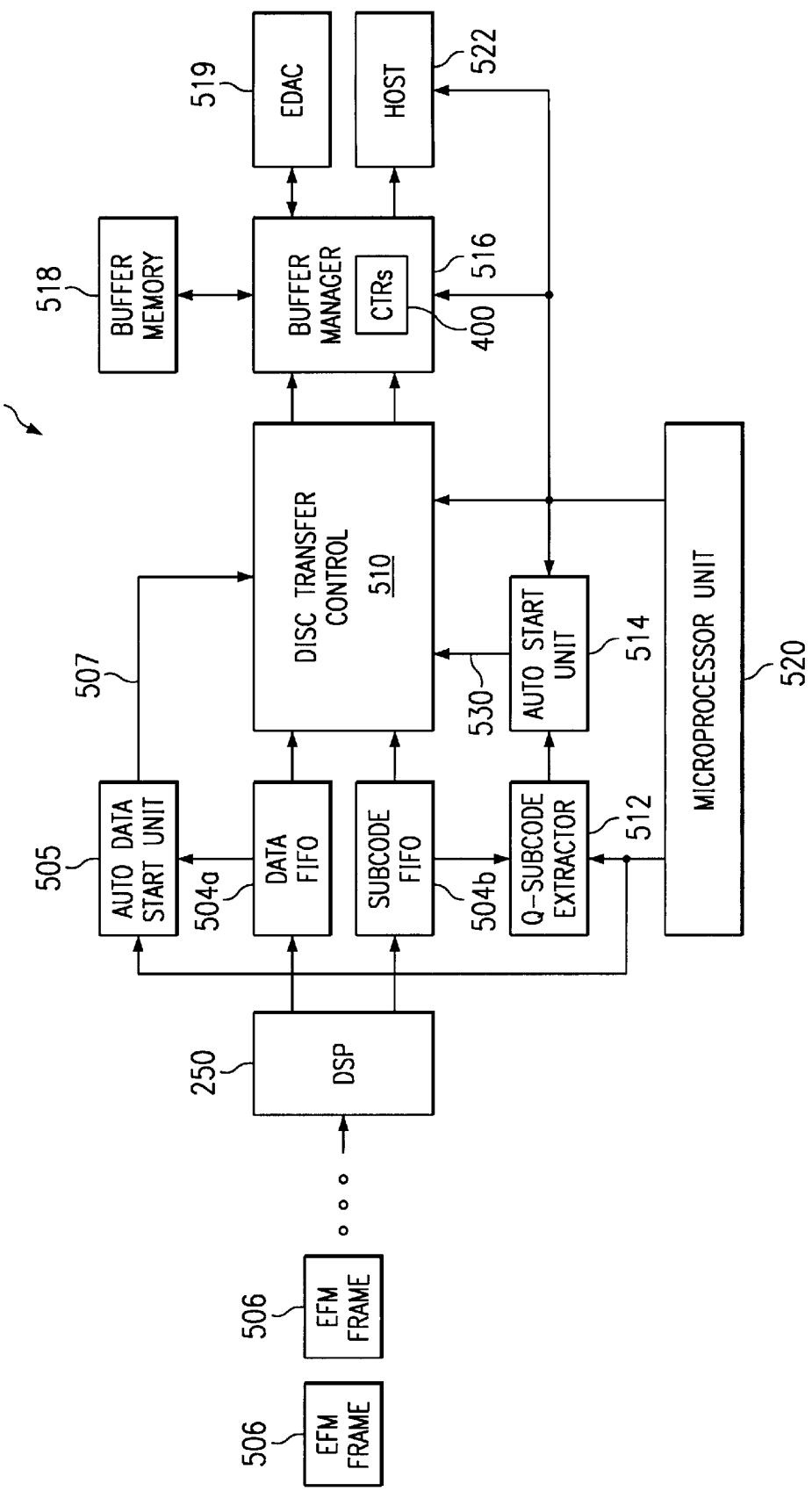
FIG. 5A is a system diagram of the functional blocks contained within a disc drive system in accordance with one embodiment of the present invention.

FIG. 5A is a system diagram of the functional blocks contained within a disc drive system 500 in accordance with one embodiment of the present invention. In operation, the digital signal processor 250 is configured to sequentially receive eight-to-fourteen modulation (EFM) frames 506 in order to process the subcode and data information contained within each EFM frame as described with reference to FIG. 2 above. As EFM frames are received by the digital signal processor 250, a parsing is performed, such that the data frames 203 are transferred out to a data first-in-first-out (FIFO) 504a, and the subcode frames 204 are transferred out to a subcode first-in-first-out (FIFO) 504b.

At this point, the subcode will have been separated from the data portion of the EFM frames 506, and therefore, FIFO 504b may contain the eight bits of subcode (i.e., P, Q, R, S, T, U, V, and W subcode bits) that are associated with each EFM frame 506. In a like manner, the FIFO 504a may contain 24 bytes of data that are also associated with each EFM frame 506. In this embodiment, a Q-subcode extractor 512 is preferably implemented to extract the Q-subcode bit from each EFM frame received by the subcode FIFO 504b. In this manner, the subcode extractor 512 will be well suited to feed an auto-start unit 514 each of the "98 Q-bits" associated with a particular sector 202 that may be in the process of being read from a compact disc (CD) media.

In a preferred embodiment of the present invention, the auto-start unit 514 is a state machine that is configured to accept the Q-bits being extracted from each EFM frame by the DSP 250, and channeled to the subcode FIFO 504b. Accordingly, when the auto-start unit 514 has received each of the 98-Q bits for a particular sector, the auto-start unit will automatically compare a minute/second/frame (MSF) parameter programmed into the 98 Q-bits of the particular sector with a desired MSF that has been requested by a microprocessor unit 520. For more information on the auto-start features of the disc drive system 500, reference may be made to the previously incorporated by reference U.S. patent application Ser. No. 08/914,296, filed Aug. 18, 1997, entitled "Methods and Apparatus for Compact Disc Automatic Start."

By way of example, if a user desires to locate a particular subcode MSF (e.g., the MSF for subcode frame 20 of FIG.

3) on a CD media, the microprocessor unit 520 will know the exact MSF for that desired location based on a prior reading of a table of contents (TOC) contained in a lead-in region of the CD media. Thus, when the auto-start unit 514 identifies a frame (ie., 98 bits) of Q-subcode that matches the user desired MSF location, the auto-start unit 514 will automatically transmit a control signal 530 to a disc transfer controller 510. As shown, the disc transfer controller 510 is configured to receive the subcode frames 204 previously partitioned by the DSP 250 and stored in the data FIFO 504*b*.

In this manner, when the disc transfer controller 510 receives the control signal 530 from the auto-start unit 514, the subcode stored in the subcode FIFO 504*b* will be transferred to a buffer manager 516. The buffer manager 516 in turn transfers that subcode to a buffer memory 518, provided the buffer memory has sufficient space to accept the transfer. When each subcode frame 204 (i.e., the 98 bytes of each sector) is passed into the buffer memory 518, the aforementioned DS counter 404 will be incremented by "1".

In a similar manner, an auto-data start unit 505 is shown in communication with the data FIFO 504*a*, which enables it to detect when a desired data MSF is passed out by the DSP 250. By way of example, the auto-data start unit 505 is preferably a state machine that is configured to compare incoming data MSF's with a desired MSF provided by the microprocessor unit 520. When the desired data MSF is detected, the auto-data start unit 505 will automatically provide a signal 507 to the disc transfer controller 510 indicating that it is time to begin transferring the data within the data FIFO 504*a* to the buffer memory 518. For example, when the MSF for data frame 20 is encountered, the auto-data start unit 505 will automatically trigger the transfer beginning with frame 20.

As mentioned above, when data frames 203 (i.e., the 2352 bytes of data) are transferred to the buffer memory 518 by the buffer manager 516, the DD counter 402 is incremented by "1". As illustrated, the counters 400 illustrated in FIG. 4 are preferably contained within the buffer manager 516, to enable the buffer manager to track the status of the incoming components. As mentioned above, the buffer manager 516 will also include the E counter 406 for counting a passing C3 ECC result, and a BCTR counter 408 for counting the number of complete blocks contained within the buffer memory 518. When a complete block is provided to the buffer memory 518, that block will be ready to be released as a synchronized block out to a host 522. In one embodiment, the buffer memory 518 may be any suitable storage medium, such as a random access memory (RAM), dynamic random access memory (DRAM), or like medium.

As mentioned earlier, the data stream 302 and the subcode stream 304 are often times not being processed at the same time once the MSF's for the data frame 203 and the subcode frame 204 are detected. As pictorially illustrated in FIG. 3, the subcode stream 304 may be leading the data stream 302 by several frames, and therefore, the subcode frames 204 will be encountered before the data frames 203. Consequently, the DS counter 404 will begin counting up before the DD counter 402. Although these components are counted at different times, the microprocessor unit 520 will preferably not release a block (i.e., a "block" having a synchronized data frame 203, a subcode frame 204 and a passing C3 ECC component) from the memory buffer 518 until all of its components are received.

The disc drive system 500 also includes an error detection and correction (EDAC) unit 519 that is responsible for checking the C3 ECC to ascertain whether any errors are present. For example, if an error is detected, the EDAC unit 519 will not allow the buffer manager 516 to increment the E counter 406. However, when the EDAC produces a good C3 ECC result, the buffer manager 516 will increment the E counter 406 for a current block. The processing performed by the disc drive system 500 will be described in greater detail with reference to a status table shown in FIG. 6A below.

In another embodiment, the synchronization features of the present invention can also be applied to the writing of data to a CD media (e.g., a compact disc recordable "CD-R" or other recordable CD media). By way of example, if the host 522 is directed to write data onto a CD media, the buffer manager 516 of FIG. 5A will implement the counters 400 to ascertain when a data component and a corresponding subcode component are received by the buffer memory 518. When the buffer memory 518 receives each of these components, the microprocessor unit 520 will perform an ECC operation to verify the integrity of the components before writing to the CD media. Accordingly, the subcode/ data synchronization advantageously serves to avoid writing mismatched subcode/data frames to the CD media, and also serves to enable efficient ECC calculations to ensure that only error free data is written to the CD media.

FIG. 5B is a flowchart diagram illustrating the method operations implemented in performing a subcode/data synchronization in accordance with one embodiment of the present invention. The method begins at an operation 552 where a user selects a data MSF from which to begin reading. By way of example, the data MSF may correspond to a desired data frame 20, which was described with reference to FIG. 3. Once the data MSF has been selected, the method will proceed to a decision operation 554 where it is determined whether subcode/data synchronization is desired. If no subcode/data synchronization is desired, the method will proceed to an operation 562 where the subcode/ data stream is output beginning with the selected data MSF. However, because no synchronization is desired (i.e., synchronization is disabled), the subcode that is most closely associated with, for example, the data frame 20 will be output. As such, in the exemplary data stream 302 and subcode stream 304, the closest subcode frame to the data frame 20 may be subcode frame 22. Thus, the output stream will have an offset.

In one embodiment, if it is determined that synchronization is desired in operation 554, the method will proceed to an operation 556. In operation 556, the user may select a subcode MSF that matches the data MSF selected in operation 552. By way of example, if the user wants to synchronize the output of subcode/data such that both the data frame 20 and the subcode frame 20 are output together, the user will preferably select subcode frame 20 in operation 556 with the aid of the auto-start unit 514. Once the desired starting data frames and subcode frames have been selected, the method will proceed to an operation 558 where a delayed block release operation is performed. As will be described in greater detail below with reference to FIGS. 6A and 6B, a delayed block release operation is used to ensure that all of the components of a data frame and subcode frame are received in the buffer memory 518 before a release to the host 522 is allowed. Once the delayed block release has been performed in operation 558, the method will proceed to an operation 560 where the synchronized subcode and data are streamed out to the host 522 and the method will be done.

Figures 5C, 5D:
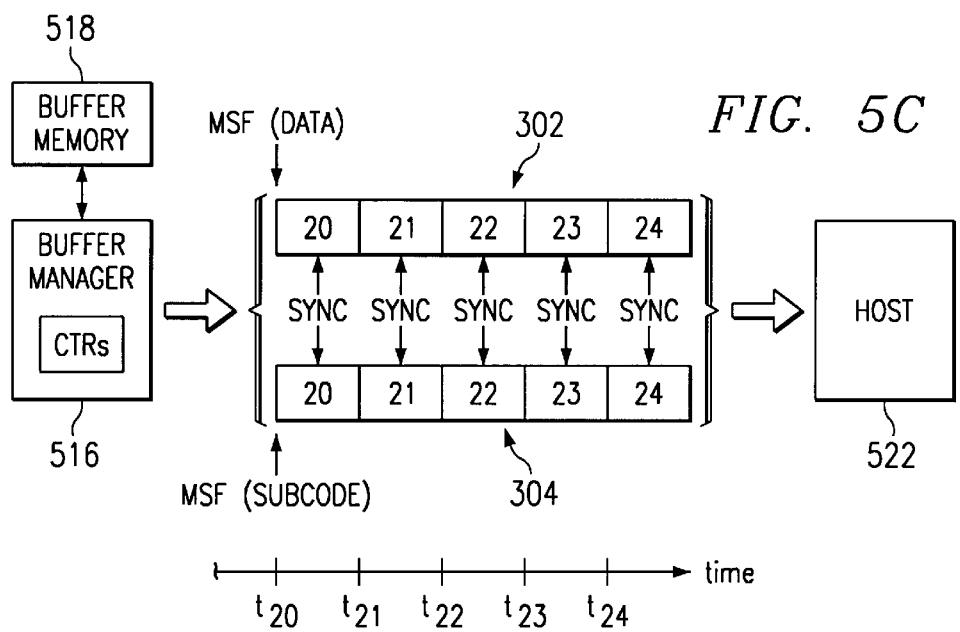
FIG. 5C provides a pictorial representation of a subcode/data synchronization performed in accordance with one embodiment of the present invention.
FIG. 5D is a table illustrating the exemplary synchronized blocks of subcode and data in accordance with one embodiment of the present invention.

FIG. 5C provides a pictorial representation of a subcode/ data synchronization performed in accordance with one embodiment of the present invention. By way of example, once the delayed block release has been performed to ensure that each of the components of a subcode/data block are present in the buffer memory 518, the buffer manager 516 will be ready to output synchronized blocks 20, 21, 22, 23, and 24. As shown, at a time $t_{20}$, a block 20 will be completely received by the buffer memory 518, and will be ready to be output to the host 522. In a like manner, each of blocks 21, 22, 23, and 24 will also be completely received by the buffer memory 518 at times $t_{21}$, $t_{22}$, $t_{23}$ and $t_{24}$, respectively. As can be appreciated, the data stream 302 and the subcode stream 304 may now be output in a synchronized manner.

FIG. 5D is a table 580 illustrating the exemplary synchronized blocks of subcode and data in accordance with one embodiment of the present invention. As shown, block 20 is released for data and subcode having an $MSF_{20}$. Similarly, blocks 21, 22, 23, and 24 are released for data and subcode having $MSF_{21}$, $MSF_{22}$, $MSF_{23}$, and $MSF_{24}$, respectively. Although the above examples have pictorially illustrated the streaming out of synchronized blocks 20 through 24, it should be understood that any number of blocks may be released using the synchronization feature of the present invention.

FIG. 6A is a table 600 that shows the organization of counters and status bits in a disc drive system 500 in accordance with one embodiment of the present invention. The table 600 is partitioned into four columns, where the first column from the left identifies the counters DD 402, DS 404, and E 406. The second column identifies the unreleased frame numbers with respect to the exemplary reading of frame numbers 20–24 as shown in FIG. 3 above. The third column indicates the status of each counter by identifying the number of data frames 203, subcode frames 204 and passing C3 ECC for a given block.

The fourth column identifies the number of complete blocks that are contained within the buffer memory 518 of FIG. 5A, and which are available for release to the host 522. For simplicity, the description of the values contained in the table 600 will be described sequentially beginning with row 1 (R1) through row 10 (R10), and with reference to the exemplary data stream 302 and subcode stream 304 of FIG. 3.

Referring to R1, DD counter 402 will begin once a data MSF for the 20th data frame 203 is found, thereby incrementing the DD counter 402 to 1 as shown in the counter status column. In a like manner, the DS counter 404 will already have been incremented three times for each of subcode frames 20, 21, and 22, by the time the data frame 20 was encountered. This is because the subcode stream 304 is ahead of the data stream 302 in this example. As a result, the counter status for the DS counter 404 is shown incremented up to 3. Of course, in another example, the data stream 302 may alternatively be leading the subcode stream 304.

In row 1, the E counter 406 will be incremented to 1 if the block associated with data frame 20 and subcode frame 20 pass the C3 ECC test performed by the error detection and correction unit (EDAC) 519. Accordingly, now that the counter status for DD is 1, DS is 3, and E is 1, the buffer manager 516 will allow data frame 20 and subcode frame 20 to be released as shown in row 2 (R2).

When this happens, the unreleased data frame 20 and the unreleased subcode frame 20 are no longer shown to be unreleased in the second column, and the counter status for the DD counter 402 is decremented by 1, the DS counter 404 is decremented by 1, and the E counter is decremented by 1. Further shown in R2 is a 1 in the BCTR 408 counter, indicating that one complete block (i.e., 20) is now releasable to the host 522.

Turning next to row 3, the next data frame 21 and the next subcode frame 23 will be transferred in, and will cause the counters to be incremented by 1 as shown in the counter status column. Next, in row 4, now that all of the components for block 21 are present in the buffer memory 518, a block release occurs for data frame 21 and subcode frame 21. As such, the BCTR 408 counter is incremented by 1, and the counter status for the DD counter 402, the DS counter 404 and the E counter 406 are decremented by 1.

Next, the data frame 22 and the subcode frame 24 will be transferred in as shown in the unreleased frame number column, and therefore, the counter status is incremented by 1 for the DD counter 402, the DS counter 404 and the E counter 406. Of course, this assumes that the C3 ECC has passed error free. Once all of the components for data frame 22 and subcode frame 22 are present and valid, we move to row 6 (R6) where block 22 is released, thereby decrementing the DD counter 402, the DS counter 404 and the E counter 406. Accordingly, when these counters are decremented, the BCTR 408 counter is incremented by 1 to signify that there are 3 releasable blocks in the buffer memory 518. In row 7 (R7), the next data frame 23 is transferred in, which increments the DD counter 402 by 1; however, the DS counter 404 is not incremented anymore because it is finished transferring in the desired subcode frames 20–24.

As described above, if the C3 ECC is good, the E counter 406 will also be incremented to 1, which completes the components for data frame 23 and subcode frame 23. Therefore, in row 8 (R8), the data frame 23 and the subcode frame 23 are released, the BCTR 408 counter is incremented by 1, and the DD counter 402, the DS counter 404, and the E counter 406 are decremented.

In row 9 (R9), the next data frame 24 is transferred in, thereby incrementing the DD counter 402 to 1, and the E counter 406 is incremented to 1 if the C3 ECC is good. At this point, the counter status indicates that all components are present for the remaining unreleased data frame 24 and unreleased subcode frame 24. At this point, in row 10 (R10), data frame 24 and subcode frame 24 are released, thereby incrementing the BCTR 408 counter. As shown, the BCTR 408 counter is now registering "5", signifying that complete releasable blocks 20, 21, 22, 23, and 24 are contained within the buffer memory 518 and are available to the host 522.

In a like manner, the counter status column indicates that there are no more unreleased frame numbers, and therefore, the counter status of the DD counter 402, the DS counter 404 and the E counter 406 are at "0". Accordingly, at this point, the transfer of all frames has been completed, thereby releasing the data frames and the subcode frames together as "a group" without introducing offsets.

Figure 6B:
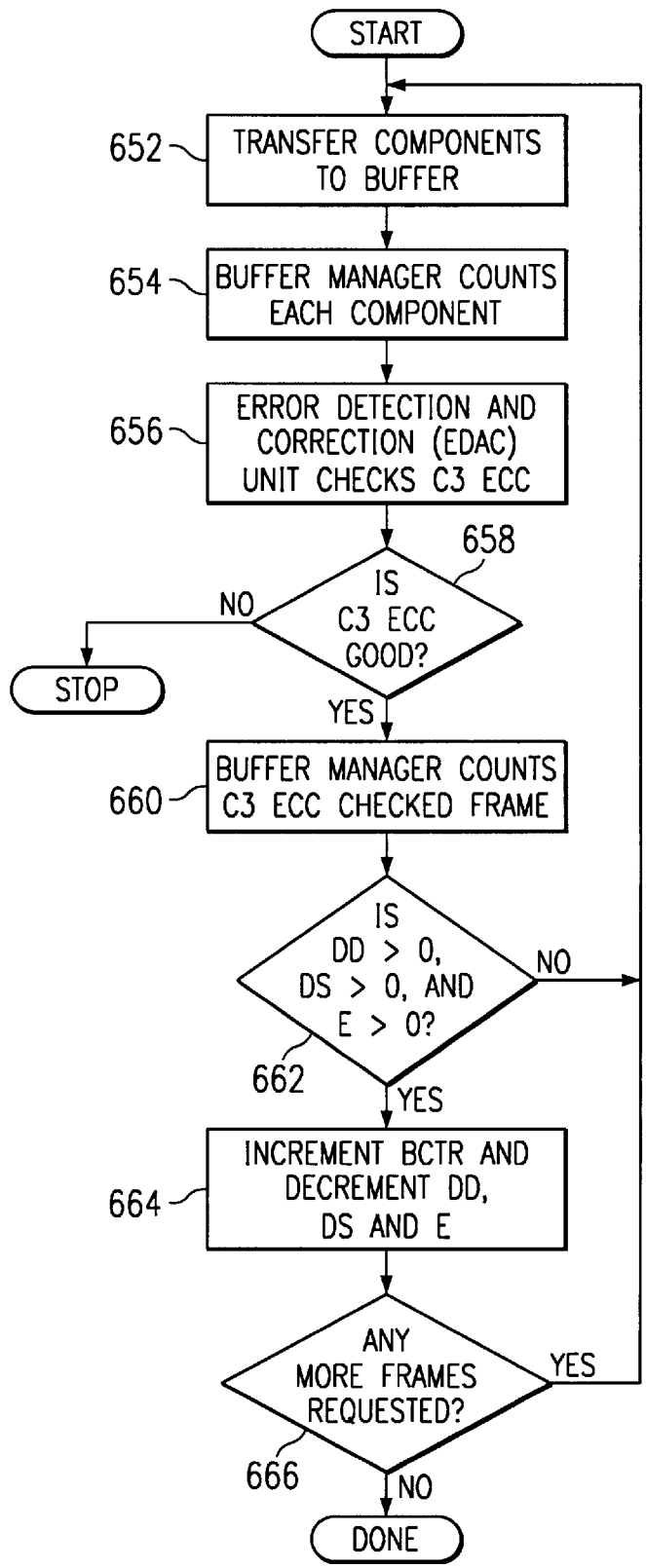
FIG. 6B is a flowchart diagram illustrating the method for transferring components to buffer memory, including error correction and detection, performed by the disk drive system of FIG. 5A in accordance with one embodiment of the present invention.

FIG. 6B is a flowchart diagram illustrating the method for transferring components to buffer memory including error correction and detection performed by the disk drive system 500 of FIG. 5A in accordance with one embodiment of the present invention. The method begins at an operation 652 where a transfer of components begins to the buffer memory 518. As described above, the data stream 302 and the subcode stream 304 may not be synchronized, and therefore either a data frame 203 or a subcode frame 204 will be transferred before the other. Once the transfer of components to the buffer has begun in operation 652, the method will proceed to an operation 654 where the buffer manager 516 of FIG. 5A counts each component being stored in the buffer memory 518.

As mentioned above, the DD counter 402 will count the data frames 203, and the DS counter 404 will count the subcode frames 204. Once the buffer manager proceeds with the counting of each component (i.e., the data component and the subcode component) in operation 654, the method will proceed to an operation 656 where an error detection and correction (EDAC) will be performed, such that the EDAC 519 will check the C3 ECC result. The method will then proceed to a decision operation 658 where it is determined whether the C3 ECC is good. In other words, this operation determines whether the data being transferred has good integrity.

If the C3 ECC is not good, the method will stop, signifying that there is an error in the data be transferred. On the other hand, if it is determined in operation 658 that the C3 ECC is good, the method will proceed to an operation 660 where the buffer manager 516 counts the C3 ECC checked frames. For example, if the C3 ECC is good, the E counter 406 will increment by 1 as described above. Next the method will proceed to a decision operation 662 where it is determined whether the DD counter 402 is greater than zero, the DS counter is greater than zero, and the E counter is greater than zero. If they are all greater than zero (e.g., as shown in R1, R3, R5, R7, and R9 of the table 600 in FIG. 6A), the method will proceed to an operation 664.

In operation 664, the BCTR counter 408 will be incremented, and the DD counter 402, the DS counter 404 and the E counter 406 will each be decremented by 1. As shown in FIG. 6A, rows R2, R4, R6, R8, and R10, each increment the BCTR 408 counter by 1 (e.g., indicating that the block has its components and is now releasable), and the counter status of each counter DD, DS, and E is decremented by 1. The method will then proceed to a decision operation 666 where it is determined whether any more frames are requested to be transferred. By way of example, if 5 frames are desired to be transferred as shown in FIG. 3, this process will proceed back through operations 652 to 664 until all 5 complete blocks have been designated as releasable. When it is determined in decision operation 666 that there are no more frames desired to be transferred at this point, the method will be done.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention. By way of example, a VHDL® hardware description language available from Institute of Electrical and Electronics Engineers (IEEE) of New York, N.Y. may be used to design an appropriate silicon-level layout. Although any suitable design tool may be used, another layout tool may include a hardware description language "Verilog®" tool available from Cadence Design Systems, Inc. of Santa Clara, Calif.

The invention may also employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 7:
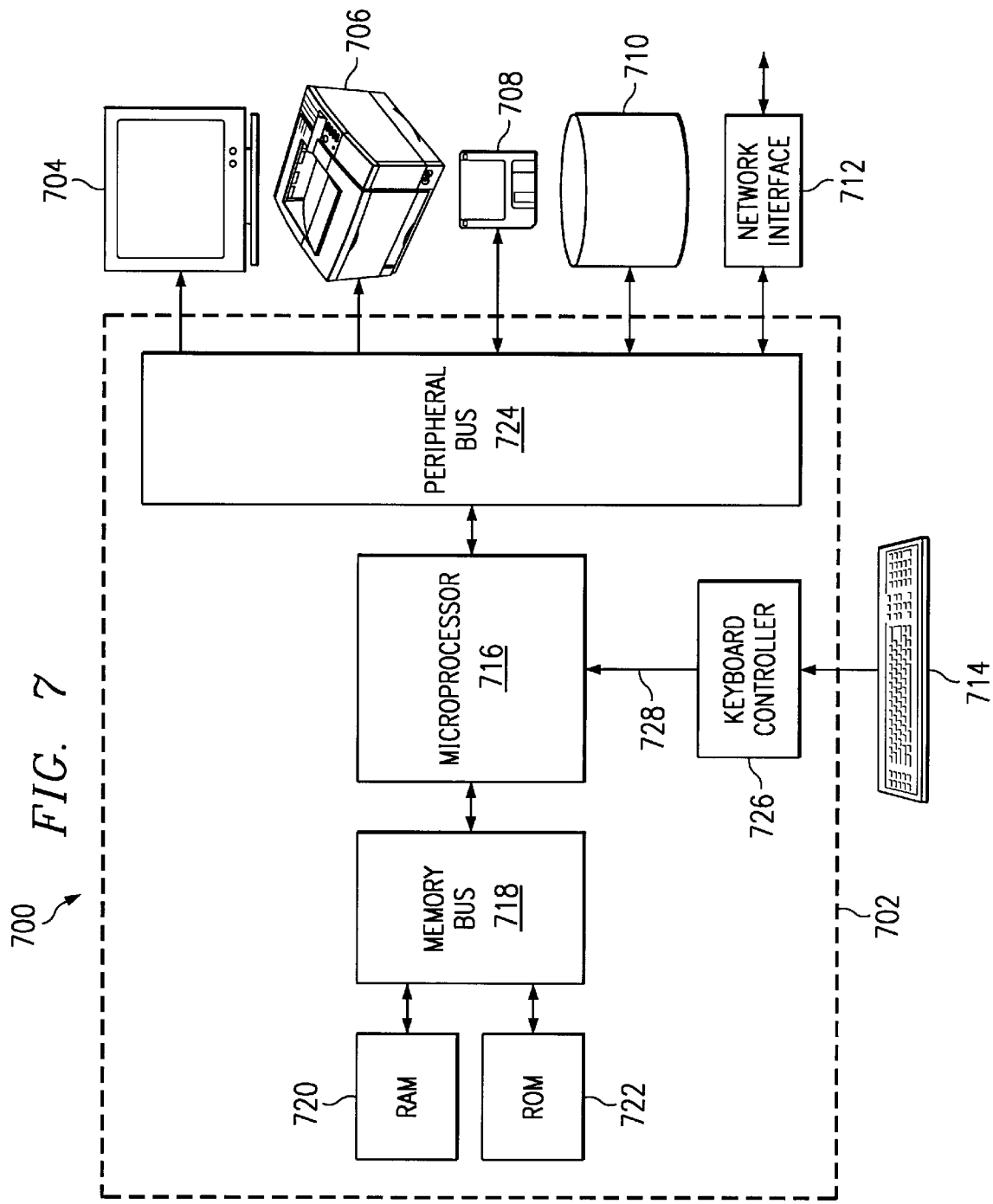
FIG. 7 is a block diagram of an exemplary computer system for carrying out some of the processing according to the preferred embodiments of the invention.

FIG. 7 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, a network interface 712, and a keyboard 714. The digital computer 702 includes a microprocessor 716, a memory bus 718, random access memory (RAM) 720, read only memory (ROM) 722, a peripheral bus 724, and a keyboard controller (KEYBD. CONT.) 726. The digital computer 700 can be a personal computer (such as an International Business Machine (IBM) compatible personal computer, a Macintosh® computer or Macintosh® compatible computer, available from Apple Computer, Inc., Cupertino, Calif.), a workstation computer (such as a Sun Microsystems or Hewlett-Packard workstation), or some other type of computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 is to assist in the delayed block release processing.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the network interface 712. The keyboard controller 726 is used to receive input from keyboard 714 and send decoded symbols for each pressed key to microprocessor 716 over bus 728.

The display screen 704 is an output device that displays images of data provided by the microprocessor 716 via the peripheral bus 724 or provided by other components in the computer system 700. The printer device 706 when operating as a printer provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operates to execute computer code and produce and use data. The computer code and data may reside on the RAM 720, the ROM 722, or the hard disk drive 710. The computer code and data could also reside on a removable program medium and loaded or installed onto the computer system 700 when needed. Removable program mediums include, for example, read only memory compact discs (CD-ROM), PC-CARD, floppy disk and magnetic tape.

The network interface 712 is used to send and receive data over a network connected to other computer systems. An interface card or similar device and appropriate software implemented by the microprocessor 716 can be used to connect the computer system 700 to an existing network and transfer data according to standard protocols.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for synchronizing information components read from a compact disc (CD) media, comprising the steps of:
   selecting a start minutes/seconds/frames for a data component;
   triggering a transfer of the data component to a buffer when the start minutes/seconds/frames for the data component is detected;
   selecting a start minutes/seconds/frames for a subcode component;
   triggering a transfer of the subcode component to the buffer when the start minutes/seconds/frames for the subcode component is detected; and
   releasing the data component and the subcode component to a host from the buffer when synchronization of the data component and the subcode component is detected.

2. A method as recited in claim 1, further comprising the step of:
   incrementing a plurality of counters that signify when the data component and the subcode component have been received by the buffer.

3. A method as recited in claim 2, further comprising the step of:
   performing an error correction on the received data component and the received subcode component to ascertain the integrity of the information components before being released to the host.

4. A method as recited in claim 1, wherein the synchronizing is performed by a disc drive system capable of reading from a CD media.

5. A method as recited in claim 3, wherein the data component and the subcode component are released to the host in blocks.

6. A method as recited in claim 5, wherein the data component includes 2352 bytes and the subcode component includes 98 bytes.

7. A method as recited in claim 5, wherein graphics information is stored in the subcode component.

8. A method as recited in claim 7, wherein the selecting of the start minutes/seconds/frames for the data component is performed through an auto data start integrated circuit state machine.

9. A method as recited in claim 8, wherein the selecting of the start minutes/seconds frames for the subcode component is performed through an auto subcode start integrated circuit state machine.

10. A disc drive apparatus, comprising:
    an auto-data start unit for triggering a transfer of a data component to a buffer when a target data minutes/seconds/frames is detected;
    an auto-subcode start unit for triggering a transfer of a subcode component to the buffer when a target subcode minutes/seconds/frames is detected; and
    a buffer manager for monitoring the contents of the buffer, such that the buffer manager counts the data component and the subcode component through separate counters, and releasing the contents of the buffer when the buffer manager synchronizes the data component and the subcode component.

11. A disc drive apparatus as recited in claim 10, wherein the separate counters include a data counter, a subcode counter, an error counter, and a complete block counter.

12. A disc drive apparatus as recited in claim 11, wherein the auto-data start unit triggers a disc transfer controller that causes the transfer of the data component to the buffer.

13. A disc drive apparatus as recited in claim 12, wherein the auto-subcode start unit triggers the disc transfer controller that causes the transfer of the subcode component to the buffer.

14. A disc drive apparatus as recited in claim 13, wherein when the buffer manager synchronizes the data component and the subcode component, the data component and the subcode component are released to a host in a block.

15. A disc drive apparatus as recited in claim 14, further comprising an error detection and correction unit for checking a C3 error correcting code (ECC) of the block before being released to the host.

16. A disc drive, comprising:
    an auto-data starting means for triggering a transfer of a data component to a buffer when a target data minutes/seconds/frames is detected;
    an auto-subcode starting means for triggering a transfer of a subcode component to the buffer when a target subcode minutes/seconds/frames is detected; and
    a buffering means for monitoring the contents of the buffer, such that the buffering means counts the data component and the subcode component through separate counter means, and releasing the contents of the buffer when the buffering means synchronizes the data component and the subcode component.

17. A disc drive as recited in claim 16, wherein the separate counter means includes a data counter, a subcode counter, an error counter, and a complete block counter.

18. A disc drive as recited in claim 17, wherein the auto-data starting means is configured to trigger a disc transfer controller that causes the transfer of the data component to the buffer.

19. A disc drive as recited in claim 17, wherein the auto-subcode starting means is configured to trigger a disc transfer controller that causes the transfer of the subcode component to the buffer.

20. A disc drive as recited in claim 17, wherein when the buffering means synchronizes the data component and the subcode component, the data component and the subcode component are released to a host in a block.

21. A disc drive as recited in claim 20, farther comprising an error detecting and correcting means for checking the integrity of the block before being released to the host.

* * * * *